(12) United States Patent
Runquist et al.

(10) Patent No.: US 10,124,509 B2
(45) Date of Patent: Nov. 13, 2018

(54) CUTTING TOOTH SYSTEM (71) Applicant: VERMEER MANUFACTURING COMPANY, Pella, IA (US)

(72) Inventors: Randy Runquist, Knoxville, IA (US); Keith Allen Hoelting, Dallas, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 15/036,374

(22) PCT Filed: Nov. 14, 2014

(86) PCT No.: PCT/US2014/065700
§ 371 (c)(1),
(2) Date: May 12, 2016

(87) PCT Pub. No.: WO2015/073821
PCT Pub. Date: May 21, 2015

(65) Prior Publication Data
US 2016/0263774 A1    Sep. 15, 2016

Related U.S. Application Data (60) Provisional application No. 61/904,702, filed on Nov. 15, 2013, provisional application No. 61/913,150, filed on Dec. 6, 2013.

(51) Int. Cl.
*E21C 35/19* (2006.01)
*B28D 1/18* (2006.01)
(Continued)

(52) U.S. Cl.
CPC ............. *B28D 1/045* (2013.01); *B28D 1/188* (2013.01); *E01C 23/09* (2013.01);
(Continued)

(58) Field of Classification Search
CPC .. E21C 35/19; E21C 2035/191; E21C 35/193; E21C 35/1933; E21C 35/1936;
(Continued)

(56) References Cited

U.S. PATENT DOCUMENTS

| 318,962 A | 6/1885 | Crump et al. |
| 3,290,096 A | 12/1966 | Stalker |

(Continued)

FOREIGN PATENT DOCUMENTS

| DE | 101 32 608 | 2/2006 |
| EP | 0 758 711 A2 | 2/1997 |

(Continued)

OTHER PUBLICATIONS

Supplementary European Search Report for corresponding European Patent Application No. 14861195 completed May 24, 2017, 6 pages.

(Continued)

*Primary Examiner* — David J Bagnell
*Assistant Examiner* — Michael A Goodwin
(74) *Attorney, Agent, or Firm* — Merchant & Gould P.C.

(57) ABSTRACT

A cutting tooth system includes a plurality of substrates, each having a base for attaching to the cutting wheel, and an outer surface opposite the base. A plurality of tooth pockets are integrally formed in the substrate, each tooth pocket having a tooth receiving aperture extending through the outer surface and into the substrate. A cutting tooth has a pocket engagement portion configured for being received in a mounting pocket. The pocket engagement portion defines a pocket engagement length and a shank defining a shank diameter. A cutter portion extends from the pocket engagement portion.

15 Claims, 9 Drawing Sheets

(51) Int. Cl.
*B28D 1/04* (2006.01)
*E01C 23/09* (2006.01)
*E02F 5/08* (2006.01)
*E02F 9/28* (2006.01)
*E02F 3/24* (2006.01)
*E02F 5/10* (2006.01)
*E21C 35/197* (2006.01)
*E02F 3/18* (2006.01)
*E02F 5/12* (2006.01)
*F16L 1/032* (2006.01)

(52) U.S. Cl.
CPC .......... *E01C 23/0933* (2013.01); *E02F 3/241* (2013.01); *E02F 5/08* (2013.01); *E02F 5/101* (2013.01); *E02F 9/2816* (2013.01); *E02F 9/2866* (2013.01); *E21C 35/19* (2013.01); *E02F 3/188* (2013.01); *E02F 5/10* (2013.01); *E02F 5/12* (2013.01); *E21C 35/197* (2013.01); *E21C 2035/191* (2013.01); *F16L 1/032* (2013.01)

(58) Field of Classification Search
CPC ....... E21C 35/197; E21C 35/18; B28D 1/188; B28D 1/045; E01C 23/0933
See application file for complete search history.

(56) References Cited

U.S. PATENT DOCUMENTS

| | | | |
|---|---|---|---|
| 3,325,219 A | | 6/1967 | Gaillon et al. |
| 3,544,166 A | | 12/1970 | Proctor |
| 3,614,164 A | | 10/1971 | Davis |
| 3,627,381 A | * | 12/1971 | Krekeler ............... E21C 35/197 299/106 |
| 3,663,063 A | | 5/1972 | Johnmeyer, Sr. |
| 4,119,350 A | | 10/1978 | Sander et al. |
| 4,342,486 A | * | 8/1982 | O'Neill .................. B28D 1/188 299/106 |
| 4,669,786 A | * | 6/1987 | Morgan ................ E21C 35/197 299/76 |
| 4,697,850 A | | 10/1987 | Tuneblom |
| 4,755,004 A | * | 7/1988 | Palmquist .............. B28D 1/122 299/106 |
| 4,755,044 A | | 7/1988 | Palmquist et al. |
| 5,016,943 A | * | 5/1991 | Wirtgen ................. B28D 1/188 299/39.8 |
| 5,582,468 A | * | 12/1996 | Latham .................. E21C 35/18 299/106 |
| 5,639,180 A | * | 6/1997 | Sulosky ................ B28D 1/186 299/39.8 |
| 5,647,641 A | | 7/1997 | Sulosky et al. |
| 5,879,109 A | | 3/1999 | Finzel et al. |
| 5,934,834 A | | 8/1999 | Perrot |
| 6,779,850 B1 | | 8/2004 | Schibeci et al. |
| 7,066,555 B2 | | 6/2006 | Hansen et al. |
| 7,290,360 B2 | | 11/2007 | Unzicker et al. |
| 7,475,949 B2 | | 1/2009 | Helsel et al. |
| D640,290 S | | 6/2011 | Stellman et al. |
| D640,291 S | | 6/2011 | Stellman et al. |
| D640,292 S | | 6/2011 | Stellman et al. |
| 8,375,605 B2 | | 2/2013 | Ruhl et al. |
| 8,480,332 B2 | | 7/2013 | Miller |
| 8,672,416 B2 | | 3/2014 | Wachsmann |
| 2002/0195869 A1 | | 12/2002 | Dybsetter et al. |
| 2004/0148823 A1 | | 8/2004 | Schenk |
| 2005/0146198 A1 | * | 7/2005 | Hill .......................... E21C 27/24 299/76 |
| 2006/0255649 A1 | | 11/2006 | Dawood |
| 2007/0056425 A1 | | 3/2007 | Bonar |
| 2008/0217986 A1 | | 9/2008 | Lebegue |
| 2008/0235997 A1 | | 10/2008 | Latham |
| 2008/0298755 A1 | | 12/2008 | Caplan et al. |
| 2009/0224596 A1 | | 9/2009 | Cooper et al. |
| 2009/0256413 A1 | * | 10/2009 | Majagi .................. B28D 1/188 299/100 |
| 2009/0302668 A1 | | 12/2009 | Stratti |
| 2010/0086254 A1 | | 4/2010 | Dofher |
| 2010/0288098 A1 | * | 11/2010 | Matsuura ............. B23D 47/123 83/830 |
| 2011/0241408 A1 | | 10/2011 | Wachsmann |
| 2013/0033085 A1 | | 2/2013 | Wade et al. |
| 2013/0145657 A1 | | 6/2013 | Ruhl et al. |
| 2014/0013634 A1 | | 1/2014 | Huber |
| 2014/0239700 A1 | | 8/2014 | Wachsmann |
| 2015/0035342 A1 | * | 2/2015 | Jonker .................. E01C 23/088 299/39.4 |

FOREIGN PATENT DOCUMENTS

| | | |
|---|---|---|
| FR | 2 732 051 A1 | 9/1996 |
| WO | 2008/063977 A2 | 5/2008 |
| WO | WO 2012/030994 A2 | 3/2012 |

OTHER PUBLICATIONS

International Search Report for corresponding International Patent Application No. PCT/US2014/065700 dated Feb. 25, 2015.
"BC 40 Trench Cutter; Cutting Wheels", Bauer Maschinen GmbH, Jul. 2011, 6 pgs.
"Cutting Tools and Blocks", Admitted Prior Art as of Nov. 15, 2013, 1 pg.
"Trenching & Leveling Block Systems and Accessories", Solid, Kennametal, 2010, 8 pgs.
"Trenching Tools", Solid, Kennametal, 2010, 8 pgs.
"Trenching, Vermeer-Earth Saw Segments", Keystone Engineering, Sep. 19, 2013, 3 pgs.

* cited by examiner

CUTTING TOOTH SYSTEM

This application is a National Stage of PCT/US2014/065700, filed Nov. 14, 2014, which claims priority to U.S. Provisional Patent Application No. 61/904,702, filed Nov. 15, 2013, and U.S. Provisional Patent Application No. 61/913,150, filed Dec. 6, 2013, the disclosures of which are hereby incorporated by reference herein in their entirety. To the extent appropriate, a claim of priority is made to each of the above disclosed applications.

BACKGROUND

The present disclosure relates generally to excavation and cutting tools such as trenching machines and microtrenching machines. Such tools are employed, for example, to cut a trench through a surface.

Some trenching applications, such as for installing cables, require cutting a narrow trench through a road surface, including asphalt and concrete, and the base material. After the trench has been cut, the cable, conduit for receiving cable, or other product is then installed within the trench. Thereafter, the trench is backfilled to repair the roadway. Example micro trenching methods are described in U.S. Pat. Nos. 5,879,109 and 5,934,834. Other micro-trenching methods are described in U.S. Patent Publication Nos. US 2008/0298755 and US 2010/0086254.

The trenching machines used for cutting such trenches typically include a cutting tool in the form of a cutting or trenching wheel. The cutting wheel includes a wheel/disc shaped carrier to which a plurality of cutting elements—cutting teeth or picks—are mounted. The cutting wheel is rotated such that the cutting teeth engage the surface to be cut to form the desired trench.

Improvements in cutting tools are desired.

SUMMARY

In accordance with aspects of the present disclosure, a cutting tooth mounting system includes a substrate having a base configured for attaching to a cutting wheel, with a tooth mounting surface opposite the base. A plurality of tooth pockets are integrally formed in the substrate. The tooth pockets each have tooth receiving openings extending through the tooth mounting surface, and each tooth pocket has an axis defining an attack angle, wherein the axes of the plurality of tooth pockets define at least three different attack angles.

In accordance with further aspects of the present disclosure, a cutting tooth mounting system includes a substrate having a first surface configured for attaching to a cutting wheel, and a tooth mounting surface opposite the first surface. At least five tooth pockets are integrally formed in the substrate with tooth receiving openings extending through the tooth mounting surface.

In accordance with still further aspects of the present disclosure, a cutting wheel system includes a cutting wheel defining an outer perimeter. A plurality of elongated arcuate substrates each have a base attached to the cutting wheel. A generally curved outer surface is situated opposite the base of each of the substrates. A plurality of tooth pockets are integrally formed in the substrate, with each tooth pocket having a tooth receiving aperture extending through the outer surface and into the substrate. In some examples, the tooth pockets each include a tooth support boss having a planar tooth support surface. In further examples, each tooth support boss defines a boss center and a boss radius at the tooth support surface, and substantially all of tooth pockets in the substrate are spaced such that a respective boss center of a first tooth pocket is separated, in the circumferential direction, from a tooth support boss of an adjacent second tooth pocket by no more than the boss radius of the first tooth pocket.

In accordance with additional aspects of the present disclosure, a cutting tooth system includes a cutting tooth with a pocket engagement portion configured for being received in a mounting pocket. The pocket engagement portion defines a pocket engagement length EL, and a shank defining a shank diameter SD. A cutter portion extends from the pocket engagement portion. In some embodiments, the engagement length EL and the shank diameter SD define a EL/SD ratio being 1.3 or less. In further embodiments, the EL/SD ratio is 1.25 or less.

In accordance with further aspects, the cutter portion includes a boss engagement rim and a tooth tip receiver. A tooth tip is situated in the tooth tip receiver, and the cutter portion defines a cutter portion height CH extending from the boss engagement rim to the tooth tip. The tooth tip receiver defines a tip receiver diameter RD. The cutter portion height CH and tip receiver diameter RD define a CH/RD ratio being 1.25 or less. The tip receiver and the tooth tip together are generally conical in some examples.

In accordance with still further aspects, an example cutting tooth system includes a substrate having a base configured for attaching to a cutting wheel with a tooth mounting surface opposite the base. First and second opposing side surfaces extend between the base and the tooth mounting surface. A plurality of tooth pockets integrally formed in the substrate have tooth receiving openings extending through the tooth mounting surface. A plurality of cutting teeth each include a pocket engagement portion having a shank and a cutter portion extending from the pocket engagement portion. The shank of each of the cutting teeth is completely received in a corresponding tooth pocket such that the shank does not extend from the substrate.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense.

Figure 1:
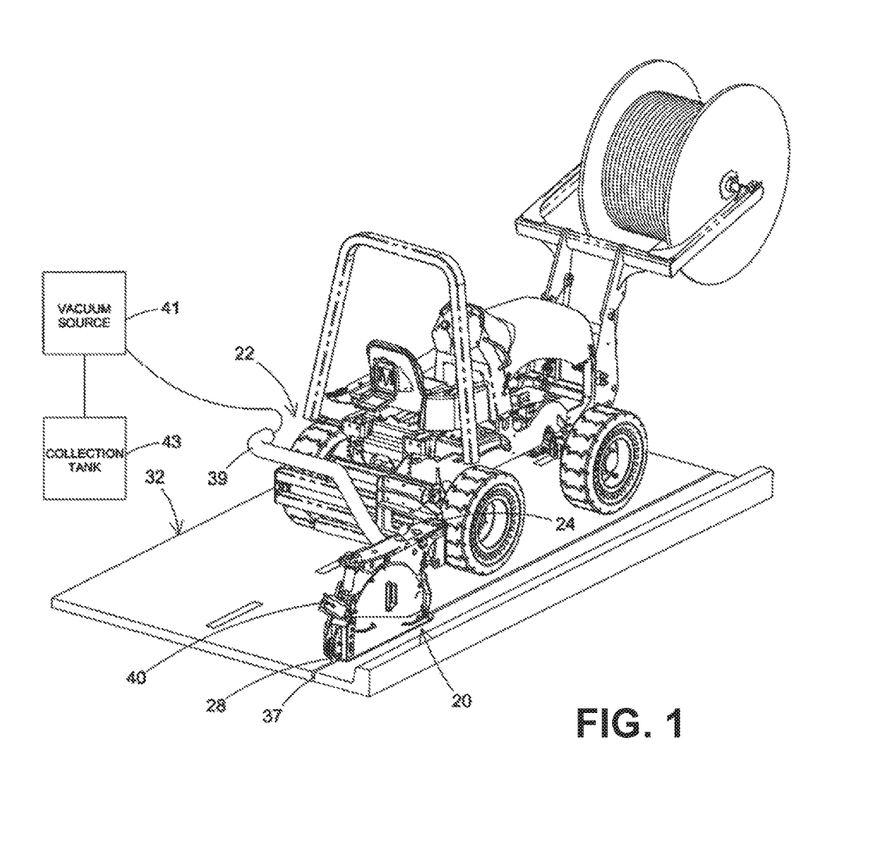
FIG. 1 is a perspective view of an example of trenching machine in accordance with certain principles of the present disclosure.

FIG. 1 shows an example of a trenching machine 20 in accordance with principles of the present disclosure. The trenching machine 20 is shown being pulled by a propelling vehicle 22 (e.g., tractor, truck or other vehicle). The trenching machine 20 is depicted as an attachment mounted at an offset configuration relative to the propelling vehicle 22 (e.g., the trenching machine 20 is shown offset to the right side of the propelling vehicle 22). The trenching machine 20 is connected to the propelling vehicle 22 at a front pivot location 24 that allows the trenching machine 20 to pivot relative to the propelling machine 22 about a vertical front pivot axis 26. The trenching machine 20 also includes a rear guide component 28 that assists in encouraging the rear of the trenching machine 20 to track at a desired position (e.g., directly behind) relative to the front pivot axis 26 of the trenching machine 20.

During some trenching operations, it is desirable to remove cuttings from the trench as the trench is excavated. In this regard, a vacuum system can be used to evacuate cuttings/debris from the trench 37. As shown in FIG. 1, the evacuation system can include a vacuum hose 39 coupled to the trenching machine 20 and in fluid communication with a source of vacuum 41 for carrying the cuttings/debris from the trench 37 to a collection tank 43. In certain embodiments, the source of vacuum 41 and the collection tank 43 can be carried by a separate vehicle (e.g., a truck) driven next to, behind or in front of the propelling vehicle 22. In other embodiments, the source of vacuum 41 and collection tank 43 may be carried by the propelling vehicle 22.

The trenching machine 20 can also include a feed arrangement 40 mounted adjacent to a rear end of the trenching machine 20. The feed arrangement 40 can be configured to feed product (e.g., communications cable, conduit, etc.) into the trench at a location behind the trenching machine 20. During trenching operations, the feed arrangement 40 can be configured to concurrently feed product into the trench behind the trenching machine 20 as the trenching machine 20 trenches in a forward direction 45. In certain embodiments, product such as telecommunications cable can be paid off a spool and fed through the feed arrangement 40. In certain embodiments, the feed arrangement can include a conduit that extends downwardly into the trench 37 at a location rearward of the rear guide component 28. The product can be fed through the interior of the conduit and into the trench 37.

Figure 2:
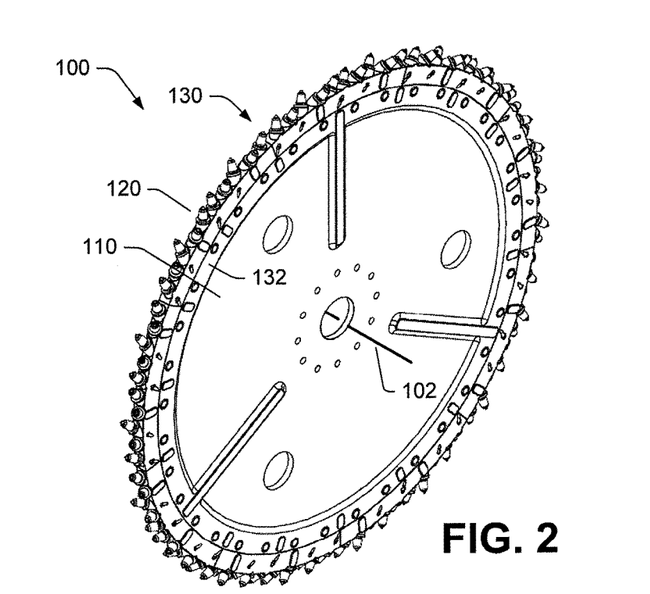
FIG. 2 is a perspective view of an example of a cutting wheel system in accordance with certain principles of the present disclosure.
Figure 3:
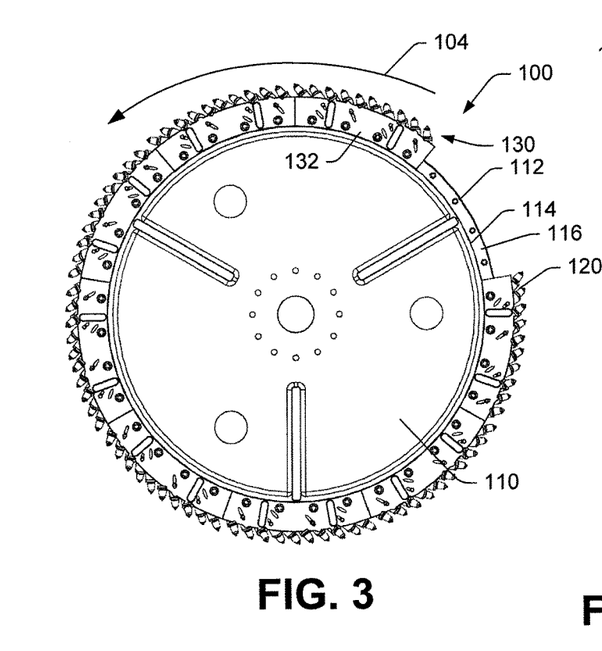
FIG. 3 is a side view of the cutting wheel system shown in FIG. 2, with one cutting tooth mounting system and associated cutting teeth removed for clarity.
Figure 4:
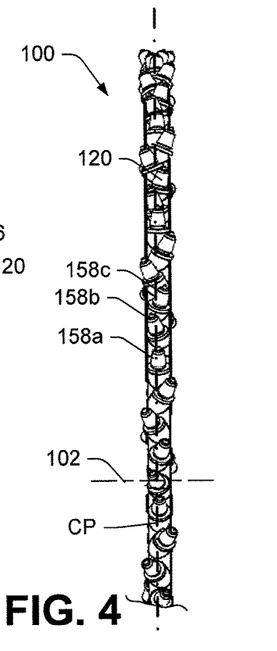
FIG. 4 is a partial end view of the cutting wheel system shown in FIG. 2.
Figure 5:
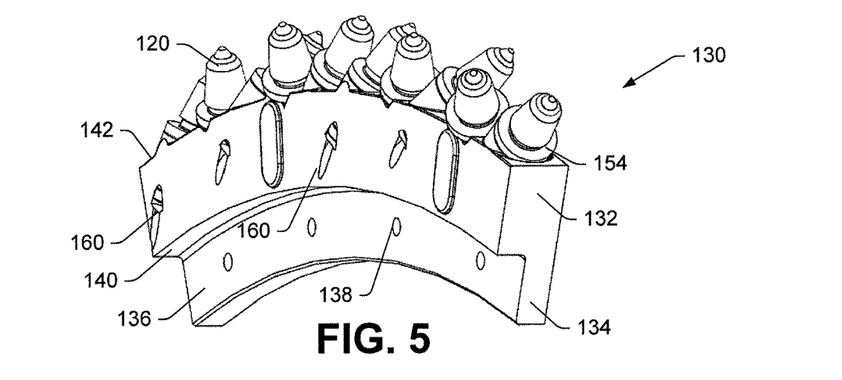
FIG. 5 is a perspective view of an example of a cutting tooth mounting system in accordance with principles of the present disclosure.
Figure 6:
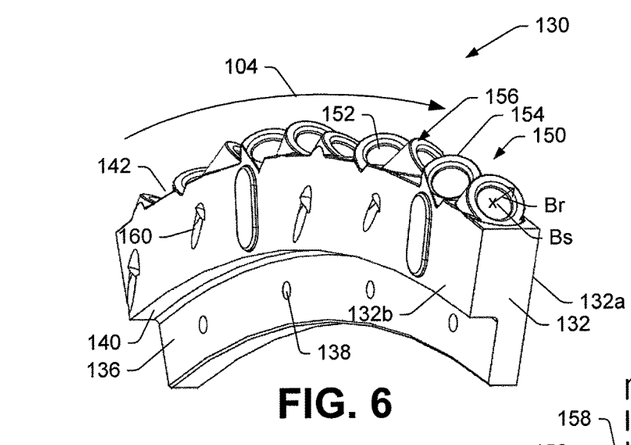
FIG. 6 is a perspective view of the cutting tooth mounting system shown in FIG. 5, with the cutting teeth removed for clarity.

The trenching machine 20 includes a cutting component in the form of a cutting wheel (i.e., a trenching wheel). FIGS. 2-4 illustrate an example cutting wheel system 100. The cutting wheel 100 includes a disc shaped carrier or cutting wheel 110 having a outer perimeter 112 to which a plurality of cutting devices are mounted. In some implementations, the cutting devices are cutting "teeth" or "picks" 120 that are mounted to the carrier 110 by a plurality of mounting substrates 132. The cutting wheel 110 is rotated about an axis of rotation 102 in a circumferential direction 104 by a drive mechanism such as a hydraulic motor.

With some known cutting wheel systems, the cutting teeth or picks are mounted using what is sometimes referred to as a "weld-on block." As the name implies, several cutting tooth support blocks are individually welded on to a mounting block, which is in turn attached to the cutting wheel. However, the use of individual weld-on blocks for supporting the cutting teeth for a cutting wheel, the minimum spacing of the teeth relative to one another is limited by the need to weld the blocks to the supporting structure. The spacing between cutting teeth resulting from the use of individual weld-on blocks can sometimes cause material excavated during the trench cutting process to be wedged into the gaps between the teeth and pulled up through the trench, resulting in an undesired widening of the trench among other things.

In accordance with certain principles of the present disclosure, a cutting tooth mounting system 130 includes a monolithic mounting substrate 132 is provided for mounting the cutting teeth 120 to the cutting wheel 110. FIGS. 5-8 illustrate an example of the mounting system 130, where the substrate 132 has a base 140 that generally defines a bottom of the substrate 132, and is configured for attaching to the outer perimeter 112 of the cutting wheel 110. A tooth mounting surface 142 is opposite the base 140. The substrates 132 are mounted to the wheel 110 such that each substrate 132 abuts an adjacent substrate 132, or the substrates 132 are mounted in close proximity to one another so that the substrates 132 together form a generally circumferential outer cutting tooth mounting surface without meaningful gaps between adjacent substrates 132 (in FIG. 3, the cutting wheel system 100 is shown with one of the substrates 132 and associated cutting teeth removed for clarity).

A plurality of tooth pockets 150 are integrally formed in the substrate 132 having tooth receiving openings or apertures 152 that extend through the tooth mounting surface 142 and into the substrate 132. Thus, rather than attaching mounting blocks to a carrier that is in turn mounted to a cutting wheel, the disclosed substrate 132 has tooth pockets 150 integrally formed therein so as to form a unitary, one-piece mounting device without seams or welds between the tooth pockets 150 and the remainder of the substrate 132. The substrate 132 may be formed from, for example, hardened 4140 steel alloy by any suitable process.

The cutting teeth 120 are received in respective tooth pockets 150. An example of a suitable cutting tooth for some implementations of the cutting wheel system is a Kennametal SM-04 cutting tooth available from Kennametal Inc. (www.kennametal.com).

As noted above, the mounting substrate 132 is configured to hold a plurality of cutting teeth 120, which allows the cutting teeth 120 to be located more closely together as compared to cutting wheels having weld-on mounting blocks, for example. The closer tooth spacing reduces the size of aggregate that can be trapped between gaps between the teeth 120. Further, when the mounting substrates 132 are attached to the cutting wheel 110, the side surfaces formed by the mounting substrate 132 together with the cutting wheel 110 in some embodiments form a planar or approximately planar side surface that also helps reduce the tendency of the cutting tool to carry bedding material as a trench is cut.

The particular mounting substrate 132 illustrated in FIGS. 5-8 is generally elongated, meaning it is substantially longer in the circumferential direction (indicated by an arrow 104) than its width w. In some examples, the tooth mounting surface 152 defines a width that is less than two times the base diameter of the teeth 120. Typical weld-on mounting blocks hold one or two teeth and so are not substantially longer than they are wide. The outer surface 142 of the substrate 132 is generally curved such that the outer surfaces 142 of the substrates 132 together when mounted on the cutting wheel 110 form a circle. Further, the outer surface 142 may be smooth to reduce the likelihood of cut material adhering around the teeth 120. Alternatively, the outer surface 142, in some embodiments, may be roughened to aid in cutting. The illustrated version is radiused, though other generally curved shapes could also be used, such as a multi-angled outer surface 142 made up of several straight segments angled so as to form a generally arcuate outer surface 142.

In the illustrated substrate 132, the tooth pockets 150 each include a tooth support boss 154 with a planar tooth support surface 156. Some of the tooth support surfaces 156 of the tooth bosses 154 extend into the outer surface 142. In certain embodiments, the outer surface 142 is either coincident with at least one point of one of the planar tooth support surfaces 156, or it is above all of the planar tooth support surfaces 156. As noted above, integrally forming a plurality of tooth pockets 150 in a single substrate 132 allows positioning the tooth pockets 150, and thus the teeth 120 received therein, close to one another to improve the trench cutting process. Thus, in the illustrated embodiment, the tooth pockets 150 (i.e. the centers of the tooth pockets 150) are separated from one another by no more than a given separation distance substantially around the entire circumference of the cutting wheel 100. In certain embodiments, each tooth support boss 154 defines a boss center Bs and a boss radius Br at the tooth support surface 142, and substantially all of the tooth pockets 150 are spaced such that a respective boss center Bc of a first tooth pocket is separated, in the circumferential direction 102, from a tooth support boss of an adjacent second tooth pocket by no more than the boss radius Br of the first tooth pocket.

Referring to FIG. 4, the cutting wheel 110 defines a central plane CP extending vertically as illustrated in FIG. 4. The cutting wheel central plane CP is perpendicular to the axis of rotation 102. In the mounting system 130 shown in FIGS. 5-8, each of the tooth mounting substrates 132 includes a mounting shoulder 134 having a second surface 136 extending from the base 140 parallel to cutting wheel central plane CP. The second surface 136 contacts and is fastened to a side surface 114 of the cutting wheel 110. In some embodiments, the second surface 136 has mounting holes 138 therethrough such that the substrate 132 can be bolted to the wheel 110. The mounting holes 138 can be threaded to receive corresponding bolts, or a nut can be situated opposite a bolt for mounting the substrate 132. In some implementations, the mounting holes 138 are threaded to receive bolts, and the holes 138 are countersunk to further receive a locking nut.

The illustrated substrate 132 further has a plurality of "knock out" openings 160 formed therein. Each of the tooth pockets 150 has a corresponding knock out opening 160 in communication therewith. If a tooth 120 is damaged, the corresponding knock out opening 160 allows access to the tooth pocket 150 from a location opposite the tooth receiving opening 152 to push the damaged tooth 120 out of the tooth pocket 150.

Figure 9:
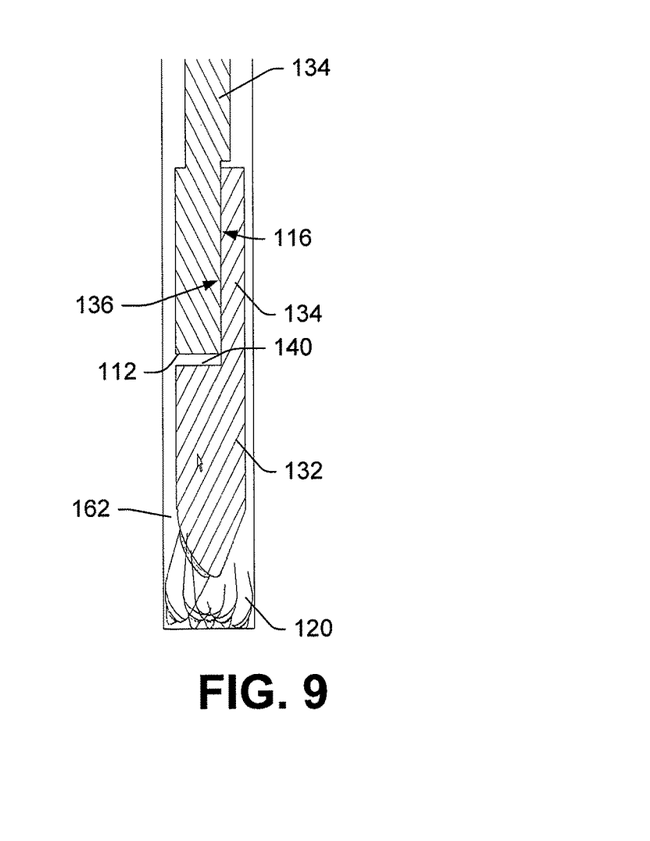
FIG. 9 is a section view showing a portion of the cutting wheel system shown in FIGS. 2-4 situated in a trench.

FIG. 9 is a section view illustrating a portion of the cutting wheel 110 and the substrate 132 situated in a trench 162. As noted above, the base 140 is attached to the outer perimeter 112 of the wheel 110. The cutting wheel 110 has a surface 116 extending perpendicularly from the outer perimeter 112 to which the second surface 136 attaches. These mounting surfaces mate such that substantially continuous planar or approximately planar side surfaces are formed that help reduce the tendency of the cutting tool 100 to carry bedding material as the trench 162 is cut.

Figure 7:
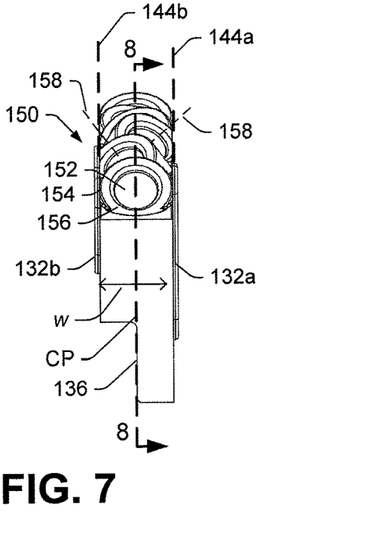
FIG. 7 is an end view of the cutting tooth mounting system shown in FIG. 6.
Figure 8:
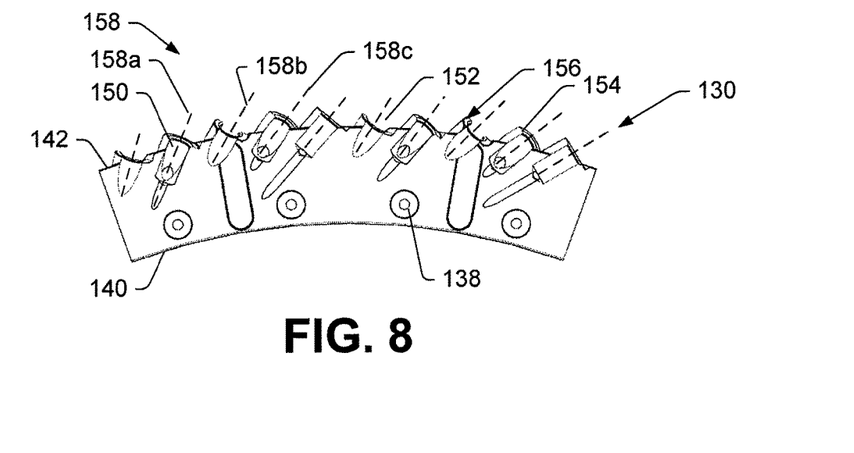
FIG. 8 is a side section view of the cutting tooth mounting system shown in FIG. 6, taken along line 8-8 shown in FIG. 7.

In some implementations, the cutting system 100 is configured for cutting narrow trenches—about two inches wide, for instance. The mounting system 130 shown in FIGS. 5-8 thus has the tooth pockets 150 arranged in a single row such that the teeth 120 received therein are situated in a single row. Referring primarily to FIG. 7, each of the illustrated tooth mounting substrates 132 includes first and second side surfaces 132a,132b extending from the tooth mounting surface parallel to the cutting wheel central plane CP that define the width w both of the substrate 132 and the tooth mounting surface 142. Each tooth support boss 154 is positioned within first and second planes 144a, 144b extending respectively from the first and second sides 132a,132b. In some embodiments, the tips of the cutting teeth 120 are also situated within width w of the substrate 132, or in other words within the first and second planes 144a,144b. In the system illustrated in FIGS. 2-8, some of the teeth 120 are angled such that the tips thereof extend beyond the first and second planes 144a,144b.

To achieve the desired cut, the tooth pockets 150, and thus the teeth 120 received therein, are angled in a predetermined fashion. The integrally formed tooth pockets 150 each have an axis 158 that defines an attack angle, which positions the respective teeth in the desired angle for cutting. In some versions, the tooth pocket axes 158 define at least three different attack angles 158a, 158b, 158c, and each axis 158 of a given substrate could define a different attack angle (the attack angles of three example teeth 120 are also labeled 158a,158b,158c in FIG. 4 to illustrate examples of different attack angles). In the mounting system 130 shown in FIGS. 5-8, the substrate 132 has ten tooth pockets 150 that define a repeating pattern of attack angles. For example, the first group of five tooth pockets 150 define a pattern of five different attack angles, and the next group of five tooth pockets 150 repeat this pattern. As shown in the example of FIG. 4, the tooth pockets 150 are arranged so as to define a pattern of attack angles such that a first one of the teeth 120a is centered on the central plane that longitudinally bisects the substrate 132 (the cutting wheel central plane CP), and the next four teeth 120b, 120c, 120d, 120e are angled such that their respective tips are on alternate sides of the cutting wheel central plane CP. This pattern is repeated with the next five teeth 120 on the substrate 132, and thus is also repeated around the circumference of the cutting wheel 110.

As noted above, integrally forming the tooth pockets 150 in the substrate 132 allows arranging the tooth pockets 150 so that the teeth 120 received therein close together. This also allows several teeth 120 to be received in a single substrate 132. For example, the substrate 132 in some embodiments has at least five tooth pockets 150 formed therein. Some implementations of the substrate 132 include a number of tooth pockets 150 varying from five to ten. In other words, depending on the cutting application, the substrate 132 may include N tooth pockets, where N is five, six, seven, eight, nine, ten, or some other number of tooth pockets 150.

Figures 10, 11:
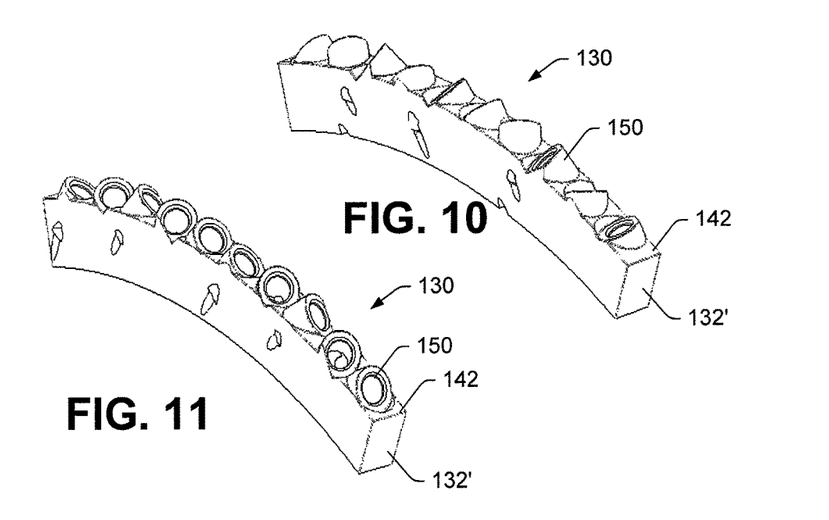
FIG. 10 is a perspective view of another example of a cutting tooth mounting system in accordance with principles of the present disclosure.
FIG. 11 is a perspective view of the cutting tooth mounting system shown in FIG. 10, illustrating the side opposite that shown in FIG. 10.
Figure 12:
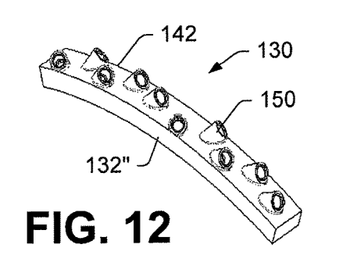
FIG. 12 is a perspective view of a further example of a cutting tooth mounting system in accordance with principles of the present disclosure.
Figure 13:
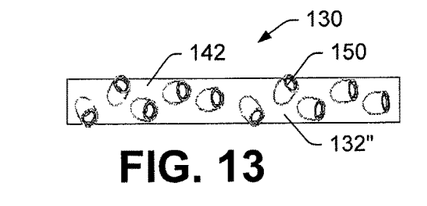
FIG. 13 is a top view of the cutting tooth mounting system shown in FIG. 12.
Figure 14:
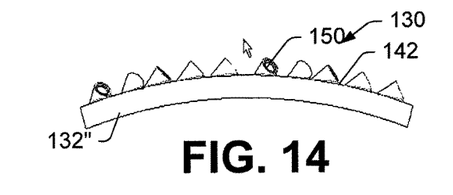
FIG. 14 is a side view of the cutting tooth mounting system shown in FIG. 12.
Figure 15:
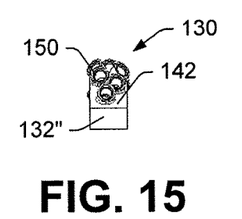
FIG. 15 is an end view of the cutting tooth mounting system shown in FIG. 12.

FIGS. 10 and 11 illustrate an alternative embodiment of the mounting system 130, showing an alternative substrate 132' without the mounting shoulder 134 and second surface 112. The substrate 132' shown in FIGS. 10 and 11 could be mounted to a cutting wheel 110 by welding the substrate 132' directly to the outer perimeter 112, or by attaching a mounting plate to the substrate 132', which would then be bolted or welded to the wheel 110.

FIGS. 12-15 illustrate another embodiment of the mounting system 130 having a substrate 132" configured to cut a wider trench. To this end, the teeth 120 are arranged in a pattern that spreads the teeth across the width w of substrate (perpendicular to the circumferential direction 114). The example shown in FIGS. 12-15 includes ten teeth 120 arranged in a predetermined, repeating pattern of five teeth 120.

FIGS. 16-19 illustrate another embodiment of the mounting system, particularly a mounting system 230. The substrate 232 is similar to the substrate 132 shown in FIGS. 5-8. The substrate 232, as illustrated, has ten tooth pockets 250 that define a repeating pattern of attack angles and further has a plurality of "knock out" openings 260 formed therein. Each respective knock out opening 260 in communication with a corresponding tooth pocket 250.

Figure 20:
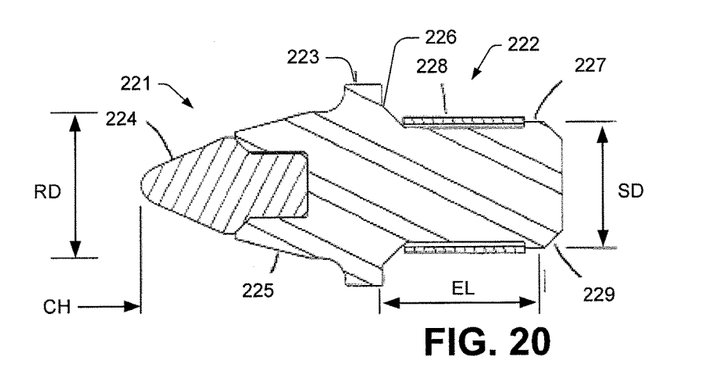
FIG. 20 is a section view illustrating one of the teeth of the system illustrated in FIG. 16.
Figure 21:
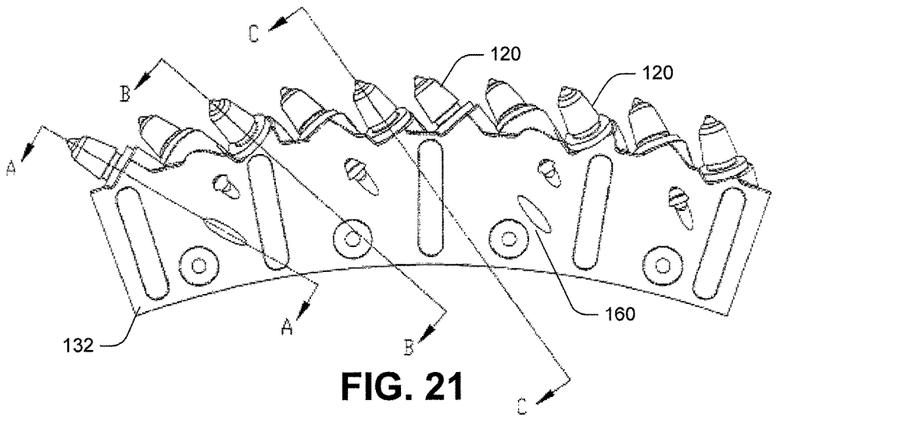
FIG. 21 is a side view of the cutting tooth mounting system shown in FIG. 5.
Figures 22, 23:
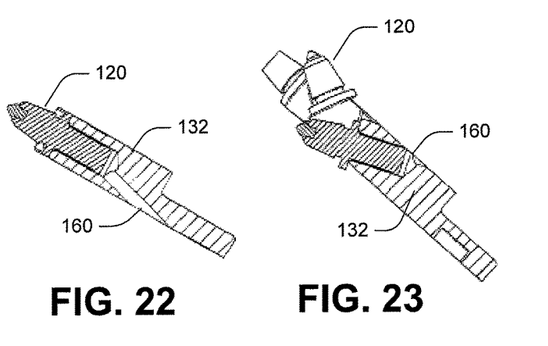
FIGS. 22, 23 and 24 are sectional views of the cutting tooth system shown in FIG. 21, taken along lines A-A, B-B, and C-C thereof, respectively.

The mounting system 230 employs a plurality of teeth 220 therein. A given example tooth 220, as seen in FIG. 20, includes a cutter portion 221 and a pocket engagement portion 222. The cutter portion 221 is comprised of a boss engagement rim 223, located adjacent the pocket engagement portion 222; tooth tip 224; and tip receiver 225. The tooth tip 224 could be made of a carbide or another known cutting element material.

The tooth tip 224 and the tip receiver 225 together may define a substantially conical structure (i.e., the respective surfaces thereof being within about 10-20 degrees of each other and, more particularly within about 15 degrees). Further, the tooth tip 224 has a tip angle TA (FIG. 28), and that tip angle TA may, for example, be about 22-26 degrees and, more particularly, about 24 degrees relative to a longitudinal tooth centerline TC. Furthermore, the tooth mount angle MA relative to a side surface of the substrate 232 may be approximately the same as that as the tip angle TA (e.g., between about 22-26 degrees, about 24 degrees in the illustrated embodiment). Such a configuration (i.e., conical structure, tip angle, and/or tooth mount angle MA) helps promote contact of a given tooth tip 224 with the trench during digging. The angular relationship between the tooth tip and the tip receiver of a typical off-the-shelf tooth, along with the tip angle of the tooth tip, is such that, during use, a tip receiver traveling along the trench width is more likely to contact the trench than the tooth tip, resulting in less than optimal digging and faster overall tooth wear.

The pocket engagement portion 222 is the portion of the tooth 220 that is configured for engaging with a corresponding tooth pocket 250. The pocket engagement portion 222 is defined by a beveled engagement face 226, a shank 227, and a rotational bearing element 228 received within a circumferential groove (not labelled) in the shank 227. The first bevel 226 is located between the boss engagement rim 223 and the shank 227. A beveled end portion 229 integrally extends from the distal end of the shank 227, but that beveled end portion 229 does not act to support the given tooth 220 within a corresponding tooth pocket 250. Accordingly, it is generally not considered to a part of the pocket engagement portion 222. Further, it is to be understood that the beveled end portion 229 could be deemed to be optional, with the tooth 220 thus ending at the distal end thereof (variant not illustrated).

The mounting system 230 varies from the mounting system 130, in one aspect, due to the shape and size of the teeth 220 employed therein. Overall, for reasons to be set forth, a goal of embodiments of the mounting system 230 is to use teeth 230 that are shorter overall than current off-the-shelf teeth and specifically shorter with respect to both cutter portion height CH and pocket engagement length EL (i.e., the distance from the distal end of the shank 227 to the boss engagement rim 223). It is expected, however, that the tip receiver diameter RD and the shank diameter SD will be similar to those of current off-the-shelf teeth, as currently sold on the market. In the example shown in FIG. 20, the cutter portion height CH is 1.61 in; the tip receiver diameter RD is 1.39 in; the pocket engagement length EL is 1.08 in; and the shank diameter is 0.87 in. In more general terms, it is desirable for the ratio of the cutter portion height CH to the tip receiver diameter RD to be about 1.25 or less and, more particularly, about 1.15 or less; and for the ratio of the pocket engagement length EL to the shank diameter SD to be about 1.3 or less or, more particularly, 1.25 or less.

Figures 16, 17, 18, 19:
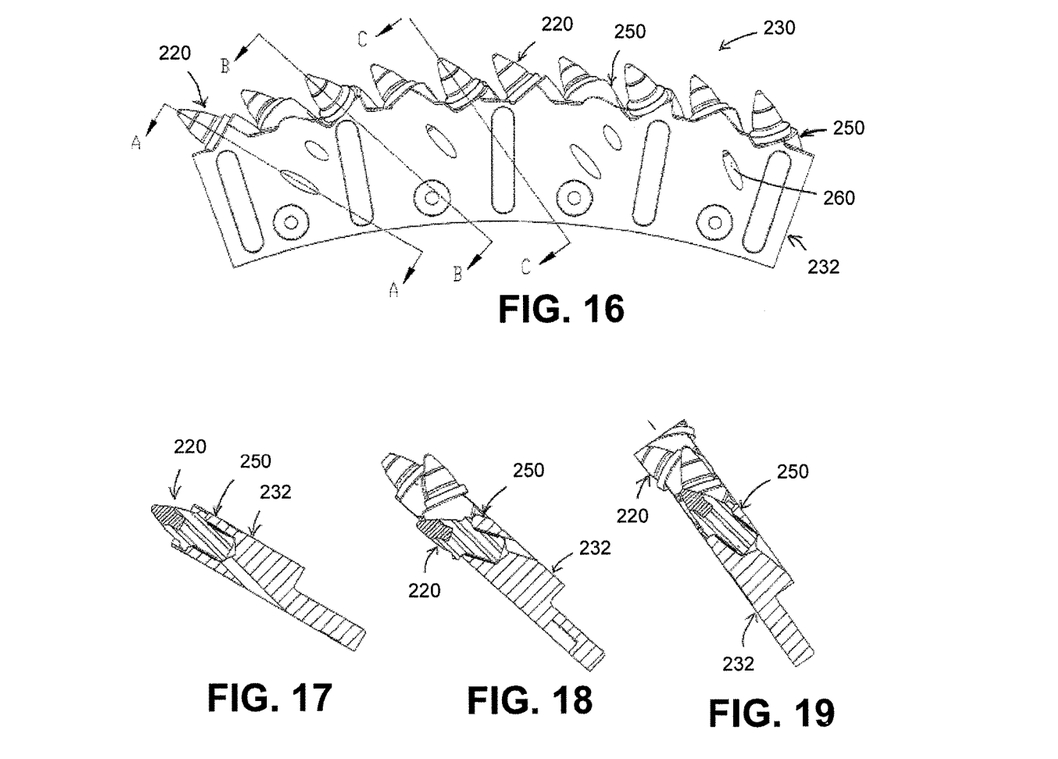
FIG. 16 is a side view of an example of a cutting tooth system in accordance with principles of the present disclosure.
FIGS. 17, 18 and 19 are sectional views of the cutting tooth system shown in FIG. 16, taken along lines A-A, B-B, and C-C thereof, respectively.

As can be seen, especially in FIGS. 18 and 19, because of the sizing of the pocket engagement length EL and, to a much lesser extent, the beveled end portion 229, the end of the shank 227 and the beveled end portion 229 are able to be completely contained within the substrate 232 such that the shank 227 and beveled end portion 229 does not extend from the substrate 232. As such, there are essentially no opportunities for the end of the shank 227 and/or the beveled end portion 229 to catch on an object in the adjacent environment (e.g., root, rock, etc.) during trenching. Such an opportunity to catch the tooth 220 could cause it to be popped out during trenching or cause premature failure and/or wear of the tooth 220.

Figure 24:
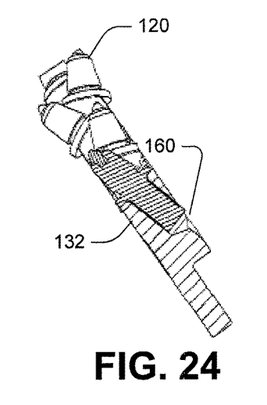

The layout of FIGS. 16-19 can be compared to that shown in FIGS. 21-24, which shows a mounting system using a more traditional tooth 120. In that layout, as best seen in FIG. 24, overextension of non-cutting portions (e.g., the shank and/or beveled end, not labeled) of the tooth 120 out of a corresponding knockout opening 160 and thus beyond the substrate 132 is a distinct possibility. That tooth 120 further has a tooth tip and tip receiver (not labeled) with a pronounced angular offset (e.g., at least about 25 degrees) therebetween, making the tip receiver more prone during digging to contacting a given trench sidewall than the corresponding tooth tip.

Figure 25:
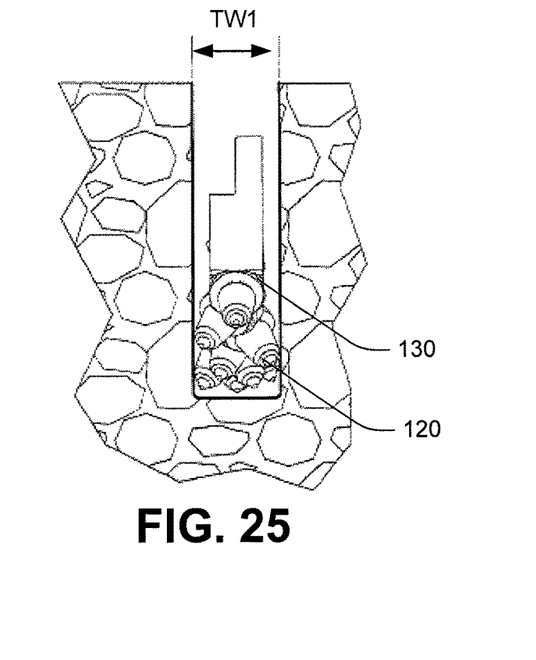
FIG. 25 conceptually illustrates aspects of a trench produced using the cutting tooth system in accordance with the system illustrated in FIG. 21.
Figure 26:
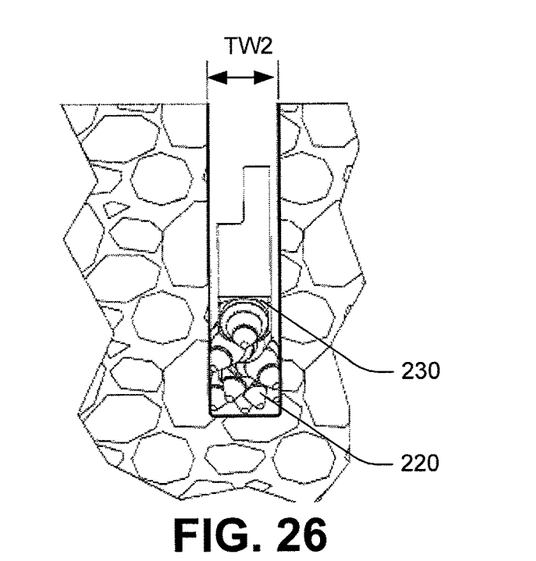
FIG. 26 conceptually illustrates aspects of a trench produced using the cutting tooth system in accordance with the system illustrated in FIG. 16.

FIGS. 25 and 26 offer a comparison of a mounting system 130 employing a "standard" tooth 120 (for example, a Kennametal tooth) versus the mounting system 230 using the tooth 220. There are some key differences that are evident. First of all, in some examples, the first trench width TW1 that can be cut using the mounting system 130 is 2.46 in, while the second trench width TW2 that can be achieved with the mounting system 230 is less than 2.4 inches. In the illustrated example, the substrate 232 has a width of 2 inches or less, and in some embodiments the tooth pockets are arranged in the substrate 232 to receive the teeth 220 such that the second trench width is about 2.03 in, which is a distinct improvement for microtrenching applications. Secondly, the geometrical factors above that permit better contact of the tooth tip 224 of the tooth 220 with the adjacent trenching area compared to the tooth tip (not labeled) of tooth 120 are readily appreciated in this side-by-side comparison.

Figures 27, 28:
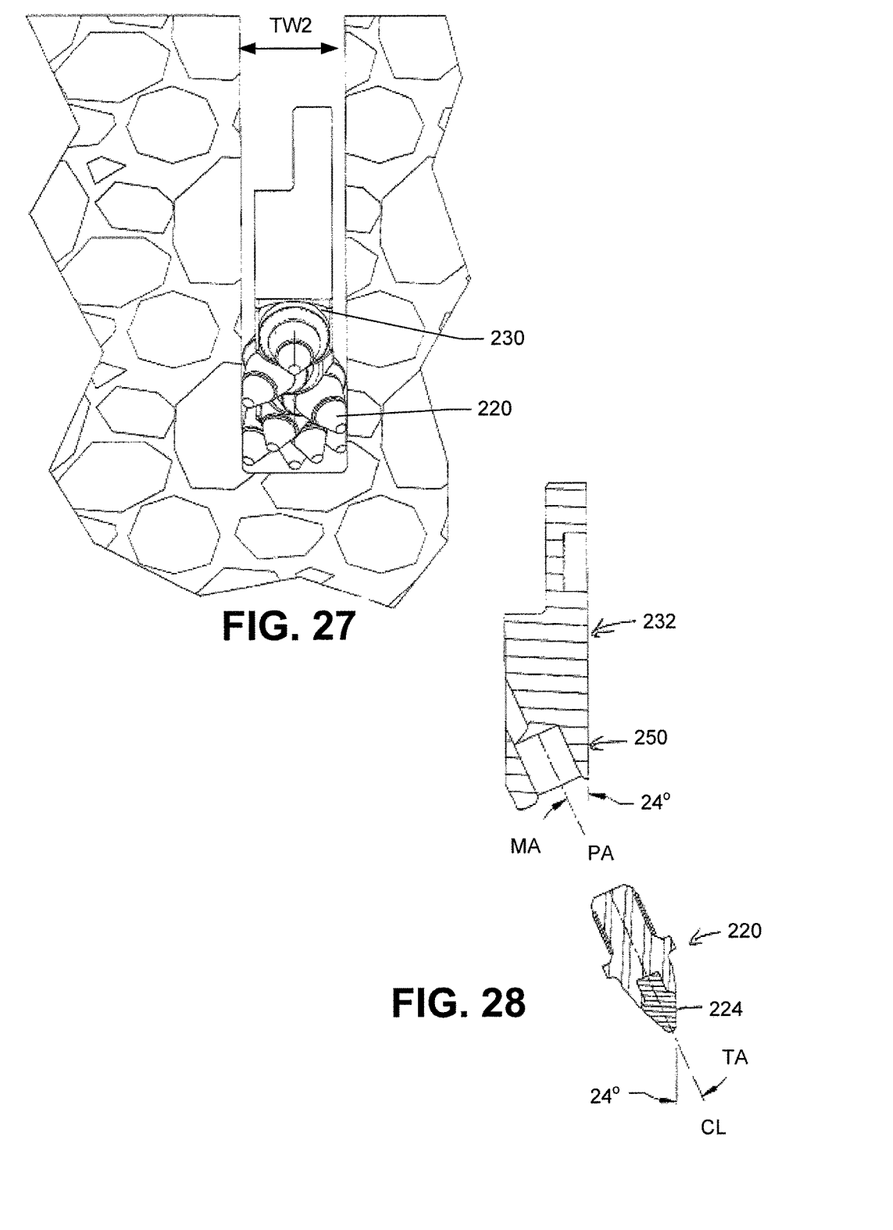
FIG. 27 is an enlarged view of the trench and cutting tooth system shown in FIG. 26.
FIG. 28 is an exploded section view illustrating aspects of the system shown in FIG. 16.

FIGS. 27 and 28 respectively provide an enlarged view of the mounting system 230 in use within a trench and an exploded version illustrating one of the mounting positions of a tooth 220 within a corresponding tooth pocket 250 of the substrate 232.

Various modifications and alterations of this disclosure may become apparent to those skilled in the art without departing from the scope and spirit of this disclosure, and it should be understood that the scope of this disclosure is not to be unduly limited to the illustrative examples set forth herein.

What is claimed is:

1. A cutting tooth mounting system, comprising:
   a substrate having a base configured for attaching to a cutting wheel, and a tooth mounting surface opposite the base, the tooth mounting surface defining a curved tooth mounting surface boundary; and
   a plurality of tooth pockets monolithically formed in the substrate having tooth receiving openings extending through the tooth mounting surface; each tooth pocket having an axis defining an attack angle, wherein the axes of the plurality of tooth pockets define at least three different attack angles, wherein each tooth pocket has a portion that extends below the tooth mounting surface boundary into the substrate in a direction toward the base.

2. The cutting tooth mounting system of claim 1, further comprising a plurality of cutting teeth, each cutting tooth received by a respective tooth pocket, wherein each tooth defines a base diameter, and wherein the tooth mounting surface defines a width that is less than two times the base diameter.

3. The cutting tooth mounting system of claim 1, wherein the tooth pockets are arranged in a single row in the substrate and angled such that teeth received in the tooth pockets have tips positioned on opposite sides of a central plane that longitudinally bisects the substrate.

4. The cutting tooth mounting system of claim 1, wherein adjacent tooth pockets define different attack angles.

5. The cutting tooth mounting system of claim 1, wherein the substrate has an arcuate shape and a curved tooth mounting surface opposite the base, wherein the tooth pockets each include a tooth support boss having a planar tooth support surface that is coincident with the tooth mounting surface.

6. The cutting tooth mounting system of claim 5, wherein each tooth support boss defines a boss center and a boss radius at the tooth support surface, the tooth pockets in the substrate being spaced such that a respective boss center of a first tooth pocket is separated, in a circumferential direction, from a tooth support boss of an adjacent second tooth pocket by no more than the boss radius of the first tooth pocket.

7. The cutting tooth mounting system of claim 1, wherein the tooth mounting surface defines a width, and wherein the tooth mounting surface is flat across the width.

8. A cutting wheel system, comprising:
   a cutting wheel defining an outer perimeter;
   a plurality of elongated arcuate substrates, each having a base attached to the outer perimeter of the cutting wheel and a curved outer surface opposite the base, the curved outer surface defining a curved tooth mounting surface boundary; and
   a plurality of tooth pockets monolithically formed in the plurality of elongated arcuate substrates, each tooth pocket having a tooth receiving aperture extending through the outer surface and into the substrate, wherein each tooth pocket has a portion that extends below the tooth mounting surface boundary into the substrate in a direction toward the base.

9. The cutting wheel system of claim 8, wherein the substrates are mounted to the cutting wheel such that each mounted substrate abuts an adjacent mounted substrate.

10. The cutting wheel system of claim 8, wherein the tooth pockets each include a tooth support boss having a planar tooth support surface that is coincident with the outer surface.

11. The cutting wheel system of claim 10, wherein each tooth support boss defines a boss center and a boss radius at the tooth support surface, the tooth pockets in the substrate being spaced such that a respective boss center of a first tooth pocket is separated, in a circumferential direction, from a tooth support boss of an adjacent second tooth pocket by no more than the boss radius of the first tooth pocket.

12. The cutting wheel system of claim 8, wherein:
   the outer perimeter defines a circumferential direction;
   each of the tooth pockets has a pocket center; and
   each pocket center is separated from the pocket center of adjacent tooth pockets in the circumferential direction by no more than a pocket separation distance around the outer perimeter.

13. The cutting wheel system of claim 8, wherein:
   the cutting wheel defines a central plane perpendicular to an axis of rotation of the cutting wheel;
   each of the tooth mounting substrates includes a mounting shoulder having a second surface extending from the base parallel to the central plane; and
   the second surface contacts and is fastened to a side surface of the cutting wheel.

14. A cutting tooth mounting system, comprising:
a main body having:
- a base surface configured for attaching to a cutting wheel;
- an arcuate tooth mounting surface opposite the base surface, the tooth mounting surface defining a curved tooth mounting surface boundary; and
- a plurality of tooth pockets monolithically formed in the main body having tooth receiving openings extending through the tooth mounting surface; wherein each tooth pocket includes a first portion that extends above the tooth mounting surface boundary and a second portion that extends below the tooth mounting surface boundary into the main body in a direction toward the base, each tooth pocket having an axis defining an attack angle, wherein the axes of the plurality of tooth pockets define at least three different attack angles.

15. The cutting tooth mounting system of claim 14, further comprising a plurality of teeth mountable within the tooth pockets, wherein, when mounted within the tooth pockets, a first portion of the each tooth extends above the tooth mounting surface boundary and a second portion of each tooth extends below the tooth mounting surface boundary.

* * * * *